United States Patent [19]
Montgomery

[11] Patent Number: 5,923,359
[45] Date of Patent: Jul. 13, 1999

[54] INTERNAL DRUM SCOPHONY RASTER RECORDING DEVICE

[75] Inventor: Derek G. Montgomery, New Westminster, Canada

[73] Assignee: Cymbolic Sciences International Inc., Blaine, Wash.

[21] Appl. No.: 08/818,034

[22] Filed: Mar. 14, 1997

Related U.S. Application Data

[51] Int. Cl.$^6$ ........................................................ B41J 2/47
[52] U.S. Cl. .......................... 347/255; 347/239; 347/256; 347/241; 347/259; 359/212; 359/834
[58] Field of Search ..................................... 347/134, 230, 347/231, 238, 239, 243, 253, 256, 259, 241, 255; 359/211, 212, 214, 305, 834

[56] References Cited

U.S. PATENT DOCUMENTS

| | | | |
|---|---|---|---|
| 3,590,248 | 6/1971 | Chatterton, Jr. | 359/123 |
| 3,823,276 | 7/1974 | Maslowski et al. | 179/100.3 |
| 4,205,348 | 5/1980 | DeBenedictis et al. | 358/481 |
| 5,072,114 | 12/1991 | Takada | 250/235 |
| 5,214,528 | 5/1993 | Akanabe et al. | 359/211 |
| 5,532,730 | 7/1996 | Akanabe | 347/259 |

OTHER PUBLICATIONS

Carlin, D.B. et al. "Multichannel optical recording using monolithic arrays of diode lasers." *Applied Optics* vol. 23, No. 22, Nov. 15, 1984: pp. 3994–4000.
Jeffree, J.H. "The Scophony Light Control." *Television and Short–Wave World* May, 1936: pp. 260–264, 310–316.
Okolicsanyi, F. "The Wave–Slot, An Optical Television System*" *Wireless Engineer* vol. 14, Oct., 1937: pp. 527–536.

*Primary Examiner*—N. Le
*Assistant Examiner*—Hai C. Pham
*Attorney, Agent, or Firm*—Hall, Priddy & Myers

[57] ABSTRACT

An optical recording and data processing system for exposing an image on to a flexible, light sensitive medium, which includes a medium holder having an inner cylindrical wall portion against which is held said medium, and a light source having an approximately rectangular emitting aperture, with a short aperture axis and a long aperture axis, operative to emit a beam of light having a rectangular cross section with a long axis corresponding to the long aperture axis and a short axis corresponding to the short aperture axis. An optical modulator is aligned with the light source so as to intercept light from the beam of light and produce a spatial modulation pattern across the long axis of the beam of light. A pattern shifter for shifting the spatial modulation pattern across the length of the long axis at a constant rate is provided as is a pattern rotator for rotating the spatial modulation pattern at a rate equal to the rate of shifting of the spatial modulation pattern. A scanner for scanning the beam of light onto and across the circumference of the inner cylindrical wall portion and a driver for advancing the scanner mechanism, after scanning a row, to an adjacent row to repeat the scanning are both provided. The relative phase angle between rotation of the spatial modulation pattern and scanning of the pattern is maintained such that the direction of movement of the projected image of said shifting is parallel to the scan motion, but opposite in direction. An optical system is provided to project the modulated beam of light and focus it to produce an image of the shifting modulation pattern at the recording medium so that the rate of shifting motion cancels the scan motion.

9 Claims, 6 Drawing Sheets

INTERNAL DRUM SCOPHONY RASTER RECORDING DEVICE

FIELD

The present invention relates to an optical recording system used to impart a raster composed image on to a flexible photo-sensitive medium. Such recording devices are well known in the industry of photographic film recorders, for exposing either finished display materials or photo-tool masters. The photo-tools are used as an intermediary, to transfer images on to a secondary medium.

BACKGROUND OF THE INVENTION

The printing industry has gone through an evolution designed to speed up the printing process and at the same time to lower costs. The film transfer to plate scheme simply exposes light sensitive photographic film with light from a low power source and then uses the processed film to transfer the image to a plate. More efficient plate imaging methods led to the direct imaging of the plates themselves. Although still using relatively low power light sources, such methods required complex plate composition and processing chemistry, and hence a large expense for the plates themselves. In a drive to reduce plate costs, the industry moved to high power laser light sources as a means of thermally exposing the image on the plate. This class of media is composed of inexpensive coatings that require little or no processing to condition the plate surfaces for printing.

In general, raster recording devices are limited in their exposing power by the brightness of the optical source. This limitation is in contrast to a flood exposure system, used to photo-graphically transfer images from a master on to a secondary medium, in which the amount of light can be increased simply by increasing the size or number of sources. Ultimately, the exposing power of any optical system reaches a fundamental maximum, for a given source brightness, once the system aperture and field of view have been filled. Because the field of view of a raster recorder usually extends over only a very small fraction of the total image area, in many cases extending over only a single image pixel element, the maximum exposure limit can be restrictive in terms of exposing power.

In particular, the image transfer process is used in the production of lithographic printing plates. The photo-sensitive emulsions appropriate for coating conventional printing plates are based on photo-polymerization reactions, which require high levels of ultra-violet exposure. The source power required to expose a conventional plate efficiently, with a raster film recorder, is prohibitive using present day technology. A transfer medium is therefore used, composed of silver-halide based emulsions which are much more sensitive to longer wavelength light and require significantly reduced levels of exposure to sensitize. After the image has been generated on the transfer medium, it is used as a photographic mask and copied by contacting it to the printing plate and providing exposure from a high intensity ultra-violet flood lamp.

Lasers are the favoured light source for many raster recording devices because of their inherent high brightness, but they are limited to known lasing materials which impose a number of design restrictions, such as the choice of available wavelengths. In particular, ultra-violet laser sources are much more difficult to manufacture, and are considerably more costly than longer wavelength lasers. Presently, semi-conductor lasers are the most commercially viable laser, in terms of cost per unit emitting power. However, they are only capable of emitting wavelengths in the near infra-red to red portion of the optical spectrum. For this reason, printing plate manufacturers have recently developed printing plates based on thermally induced material changes that are sensitive to high power, near-infra-red (NIR) exposure instead of ultra-violet.

The exposure mechanism of thermally induced media is fundamentally different than photo-polymer or silver-halide processes. The latter processes can integrate exposures without suffering significant reciprocity effects. The former utilize emulsions which react to the thermal load imparted by the exposure, and will undergo a permanent state change, such as ablation, only when a certain temperature threshold has been exceeded. If the thermal load is allowed to dissipate before the threshold has been reached, no change in the reactive material will occur. It is important to consider this effect when designing a raster optical recording system, because some architectures provide varying delays between adjacent lines of raster, which could result in exposure uniformity problems.

Semi-conductor lasers are characterized not only by their wavelength, but also by the form of the emitting aperture. In general, state of the art high power laser diode sources emit from a stripe aperture, which generates a single transverse mode from the width of the strip in one axis, and is multi-modal over its length. NIR lasers of equivalent power (approximately 5 watts), which produce a circular spot, are much more costly than such diode lasers. An example of high power lasers which emit a circular spot is known as a YAG (yttrium aluminum garnet) laser. The brightness of the laser diode is limited by material damage thresholds so that total power can only be increased by enlarging the emitting aperture. The aspect ratio of the emitting aperture can be varied, allowing an increase in total output power to be achieved by increasing the length of the strip rather than increasing its width. The resulting rotational asymmetry imposes restrictions on the design configuration of an efficient raster optical system.

One method of recording high bandwidth and high resolution image data, using an optical source which is extended in one axis, was developed in the 1930's for television applications, and is referred to in the literature as "Scophony" projection. Referring to FIG. 1, the "Scophony" projection system employs an extended source 11 to illuminate an acousto-optic cell 13, with the long axis of the source being parallel to the direction of acoustic propagation. The diffracted light from the acoustic cell 13 is focused on to the recording surface 17, and the image of the acoustic amplitude can be resolved as it traverses the beam. The diffracted light beam is then scanned by mechanical means to sweep across the raster lines of the recording surface 17, and is aligned so that the long axis of the imaged acoustic cell lies along the direction of scanning 19 on the recording surface 17. If the velocity of the scan motion 19 at the recording surface 17 is equal in magnitude but opposite in direction to the velocity of the imaged acoustic motion 23, the image pattern will remain stationary.

In the historical Scophony projection system the recording surface is a planar one and the scanner is a rotating cylinder having a plurality of elongated planar facets orientated parallel to the axis of the cylinder with the axis of the cylinder perpendicular to the direction of propagation of the incident beam. The scan motion produced by the rotating mirror facets is inherently non-linear because the angle of incidence at the recording plane varies along the scan line. Complex corrective optics can be employed to partially compensate for the distortion, but they are expensive and ultimately restrict the number of resolvable pixel elements and the allowable source aperture aspect ratio.

There are many other optical system architectures used to record raster images on to flexible media. One such system is the internal drum scanning system in which a flexible medium is seated against an interior cylindrical mounting surface. A rotating optical element, usually a mirror or prism, which is disposed along the axis of the cylinder, redirects the modulated light beam radially with respect to the cylinder axis, scanning the beam along the cylinder circumference as it spins. The rotating scanner is translated by means of a mechanical carriage transport, which provides the slow scan axis of motion. Many machines in commercial production today employ this basic architecture in one form or another.

Another architecture is the external drum architecture in which a rotating drum carries a light sensitive plate or film clamped or otherwise held against its exterior surface. A writing head moves back and forth along the length of the drum and exposes pixels on the light sensitive recording medium. A major problem with such a system resides in the requirement of having to rotate a large drum, of considerable mass and rotational inertia, at the high speeds necessary to achieve fast recording rates (state of the art systems plot at raster rates in excess of 200 lines per second). Some external drum systems, overcome this problem by maintaining a relatively slow and manageable rotational rate, and exposing the medium with an array of modulated light sources. By recording multiple raster lines in parallel, a high pixel throughput can be maintained, but at the expense of increased system complexity and cost.

A major advantage of the internal drum configuration resides in the fact that it does not require the large mass associated with a drum to rotate. The relatively small axial scan mirror can be mounted directly on to a motor spindle and rotated at high speeds while still maintaining mechanical accuracy. In addition, the configuration does not have inherent distortion as does the planar recording projection system. The beam is directed through the central axis of the lens elements, and the distance to the recording plane is maintained constant throughout the scan motion. This results in a very simple, robust and inexpensive optical system.

However, a single faceted axial optical scanning element, used in an internal drum scanning system, causes the projected image at the recording plane to rotate about the optical axis as the beam scans along the cylinder circumference. If only circular symmetric, single spots are to be projected on to the recording plane, this rotation effect is unimportant. Therefore, circular beam lasers are the natural ones to use with an internal drum scanning system. For more complex systems which use non-rotationally symmetric optical sources, such as linear arrays, compensation is required. U.S. Pat. No. 3,823,276 issued to Maslowski et al, discloses an optical data read system that projects an image of an array of spots from an inner cylinder surface on to a stationary CCD array. In order to compensate for the image rotation induced by the axial scanning element, a rotating dove prism is interposed in the beam path, and rotated at half the scan rate.

If an elongated source is introduced in an internal drum optical recorder, the rotation of the elongated image must be compensated for. This also can also be accomplished by means of a rotating prism synchronized to track the scan rotation. The phase of the rotation compensation can be adjusted to align the long axis with the scan axis, which is the required orientation for Scophony imaging. If the scan rates are tuned properly, the Scophony matching condition can be for a given acoustic rate and optical system magnification.

Accordingly, it is an object of the invention to provide an optical system, which can provide fast, accurate image recording with a relatively high power light source. It is a further object to provide a system which can accommodate a light source of asymmetric proportions, and is capable of exposing high quality raster images on flexible media. It is also an object of this invention to increase the exposing power of an internal drum raster recording device by increasing the extent of the source without degrading the image quality, by means of Scophony imaging. It is a particular object of this invention to facilitate the direct exposure of printing plates without the necessity of producing a transfer medium.

SUMMARY OF THE INVENTION

According to the invention there is provided an optical recording and data processing system for exposing a raster image on to a flexible, light sensitive medium, which includes a medium holder having an inner cylindrical wall portion against which is held the medium, and a light source having an approximately rectangular emitting aperture, with a short aperture axis and a long aperture axis. A lens system collects the emitted light and projects a beam having a secondary beam waist which has a rectangular cross section with a long axis corresponding to the long aperture axis and a short axis corresponding to the short aperture axis. An optical modulator is aligned with the light source so as to intercept light at the secondary beam waist and produce a spatial modulation pattern across the long axis which shifts across the length of the long axis at a constant rate. A rotatable multiple beam deflector is positioned in the path of the beam and rotates so as to rotate the spatial modulation pattern at a constant rate. The modulated light beam is directed and focused onto a scanning deflector interposed along the axis of the cylindrical wall portion, such that after undergoing scan deflection, the light is focused onto the inner cylindrical recording surface. The focused light at the recording surface forms an image of the spatial modulation pattern. The scanning deflector scans the beam of light around the circumference of the inner cylindrical wall portion at a constant angular rate, equal to the rate of rotation of the spatial modulation pattern. The relative phase angle between rotation of the spatial modulation pattern and scan means is maintained such that the direction of movement of the projected image of the shifting modulation pattern is parallel to the scan motion, but opposite in direction. The velocity of scanning at the inner cylindrical recording surface is constant and maintained equal to the shifting velocity times the optical magnification between the modulator and the recording surface. A scanning deflector advancement assembly advances the scanning deflector along the cylinder axis, one pixel spacing for each scan rotation, to expose successive lines of raster and provide complete coverage of the raster image.

Alternatively, the extended source may modulated directly along its long aperture axis, and imaged on to the recording plane without the need for secondary relay optics and a modulator. This may be provided by an array of individual diode emitting elements that are modulated sequentially to produce a spatially shifting pattern.

The light source may be a laser diode.

The optical modulator may be an acousto-optic modulator.

The scanning defector may be an optical deflector rotatably disposed along the axis of the inner cylindrical wall portion so as to redirect light traveling along the axis approximately 90 degrees and normal to the light sensitive medium and to rotate the optical deflector about the axis at a constant rate and thereby provide optical scan coverage around the inner circumference of the inner cylindrical wall portion. Preferably, the optical deflector has a mirror surface at 45 degrees to the direction of incidence of light traveling along the axis.

The means for rotating the spatial modulation pattern may be a dove prism. Alternatively, a k-prism or a Paschen prism may be used. Such prisms will produce an image rotation rate equal to double the prism rotation rate. Therefore the prism must be rotated at the scan rotation rate to affect the image rotation compensation.

The optical recording and data processing system may include a flexible light recording sheet of material mounted against an inner cylindrical mounting surface, which includes a laser diode light source having a rectangular emitting aperture with a long axis and a short axis coupled to provide a beam with a secondary rectangular waist having short and long axes corresponding to the short and long axes of the aperture. An acousto-optic modulator crystal is positioned to intercept the light beam at the waist so that the long axis of the waist is parallel to the direction of acoustic propagation. The acoustic wave diffracts a fraction of the incident light by an amount which depends on the amplitude of the acoustic wave. The modulation of the acoustic wave pattern shifts across the long axis of the beam waist causing the diffracted light to be spatially modulated. A prism is positioned to intercept the light beam after modulation and to rotate the diffracted image from the modulator. After rotation by the prism, the light beam is directed along the axis of the cylindrical mounting surface on to a rotating-optical mirror surface oriented at 45 degrees to the beam axis, so as to deflect the light beam radially, and scan it along the inner circumference of the cylinder wall. The lens elements used for imaging the acousto-optic modulator plane on to the recording surface, are chosen to provide an optical magnification equal to the ratio between the acoustic velocity of the modulator crystal and the scan velocity.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

Figure 1:
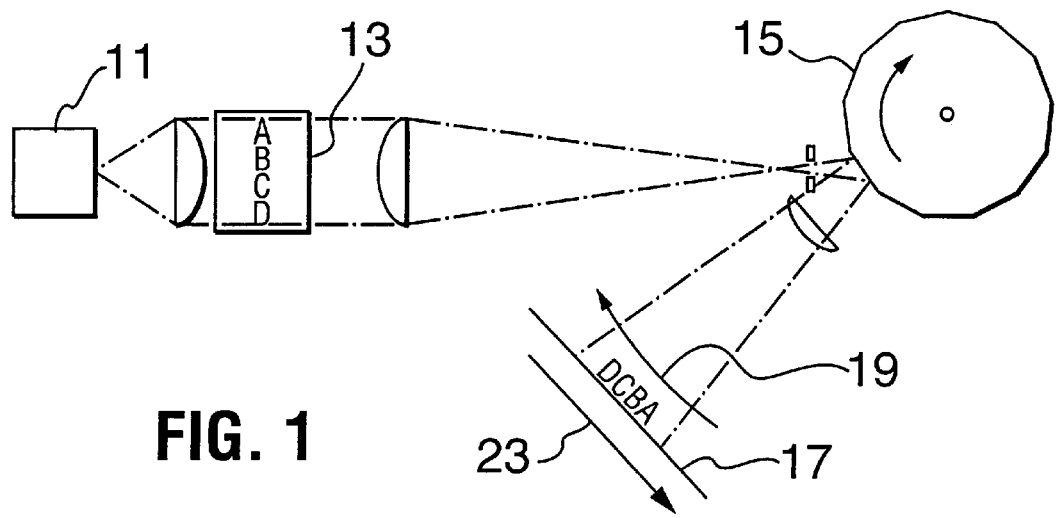
FIG. 1 is a schematic diagram of the original Scophony projection system for television applications.
Figure 2:
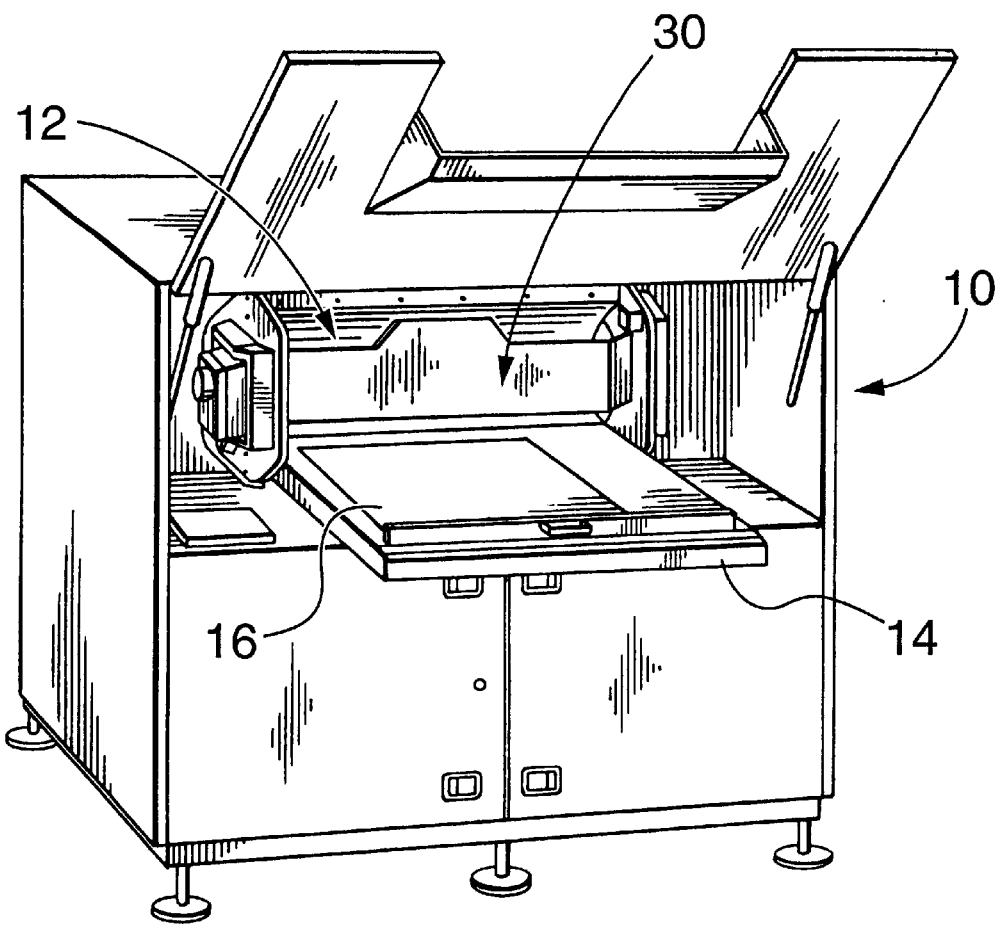
FIG. 2 is a perspective frontal view of an internal drum opto-mechanical recorder showing the cylinder and micropositioner assembly and feed tray.
Figure 3:
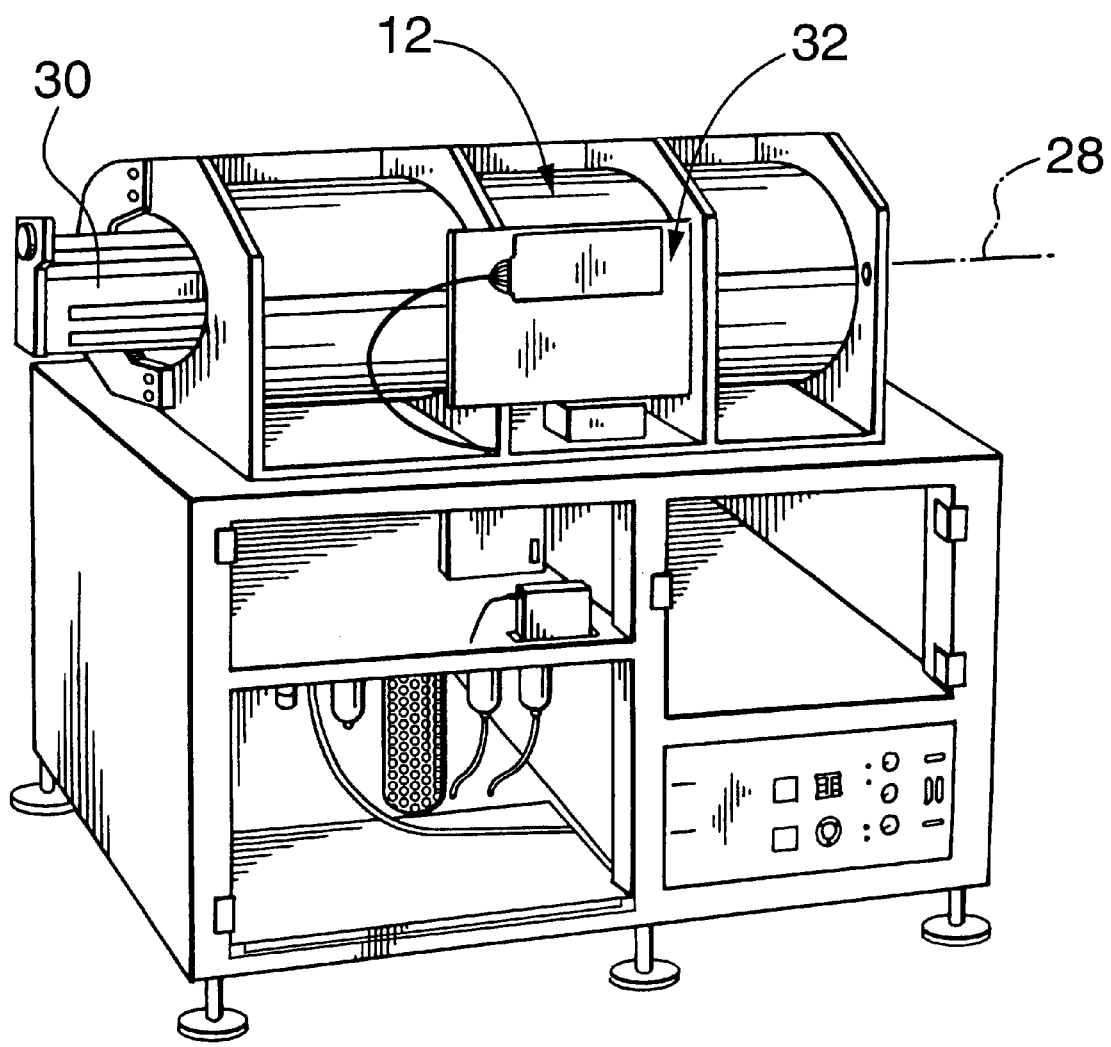
FIG. 3 is perspective rear view of the recorder showing the source optics assembly mounted on the rear of the cylinder.

Referring to FIG. 2, a general illustration of the opto-mechanical recording system 10, is comprised of a half cylinder 12 and attached feed tray 14 to permit transverse loading and unloading of the recording media 16. The recording medium 16 is flexible and held in place against the inner surface of the cylinder 12 by mechanical means or by vacuum applied through perforations (not shown) in the surface of cylinder 12. Referring to FIG. 3 the rear of the system 10 discloses the cylinder 12 and location of a source optics assembly 32 adjacent thereto. A micropositioner assembly 30 positioned across the open face of the cylinder 12 is a mechanical drive system which translates the scan prism assembly 20 (see FIG. 4) back and forth across the length of the cylinder 12.

Figure 4:
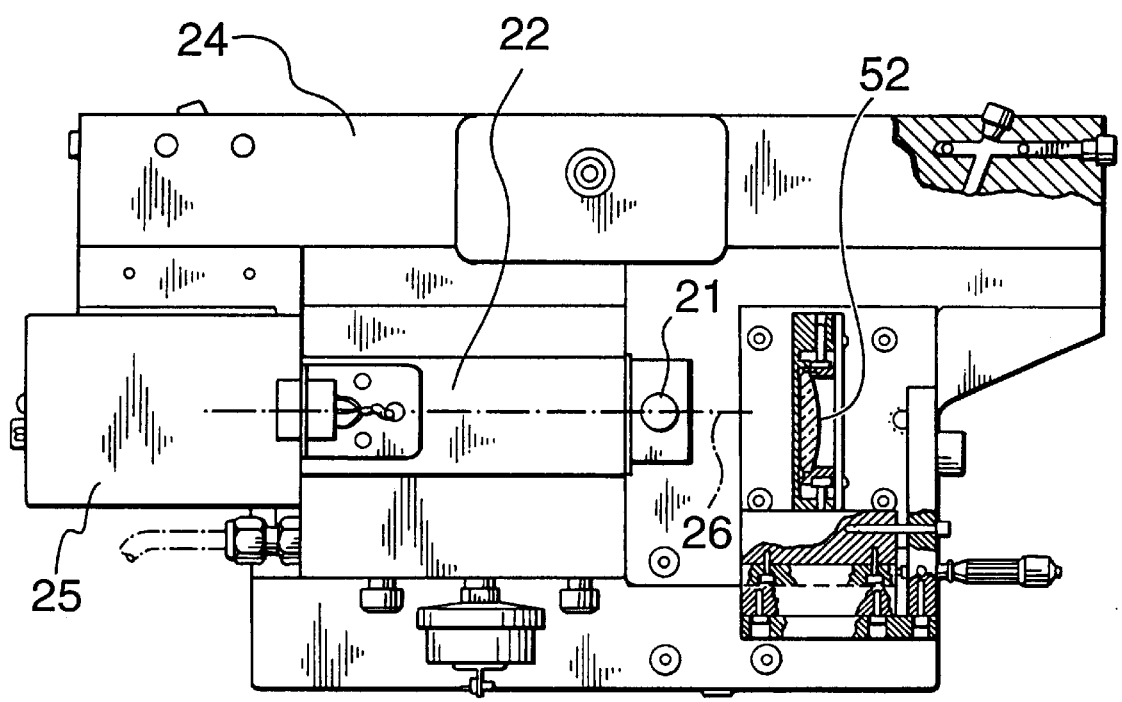
FIG. 4 is elevation view of the spindle and scan mirror partly in section.

As shown in FIG. 4, a single faceted scan prism assembly 20 is attached to a mechanical spindle 22, which, in turn, is mounted on a carriage 24, such that the spindle axis 26 is coincident with the cylinder axis 28 shown in FIG. 3. The carriage 24 is part of the micropositioner assembly 30, which translates the scan prism assembly 20 back and forth across the length of the cylinder 12. The optical source assembly 32 is mounted on the back of the casting of cylinder 12, as shown in FIG. 3. It modulates the light and generates a collimated beam which is directed at the scan mirror assembly 20 by two turning mirrors 51 and 53 (see FIG. 7). A tachometer assembly 25 is coupled to spindle 22 and has an optical encoder (not shown) which measures the speed of rotation and phase of the rotating prism 21.

Figure 5:
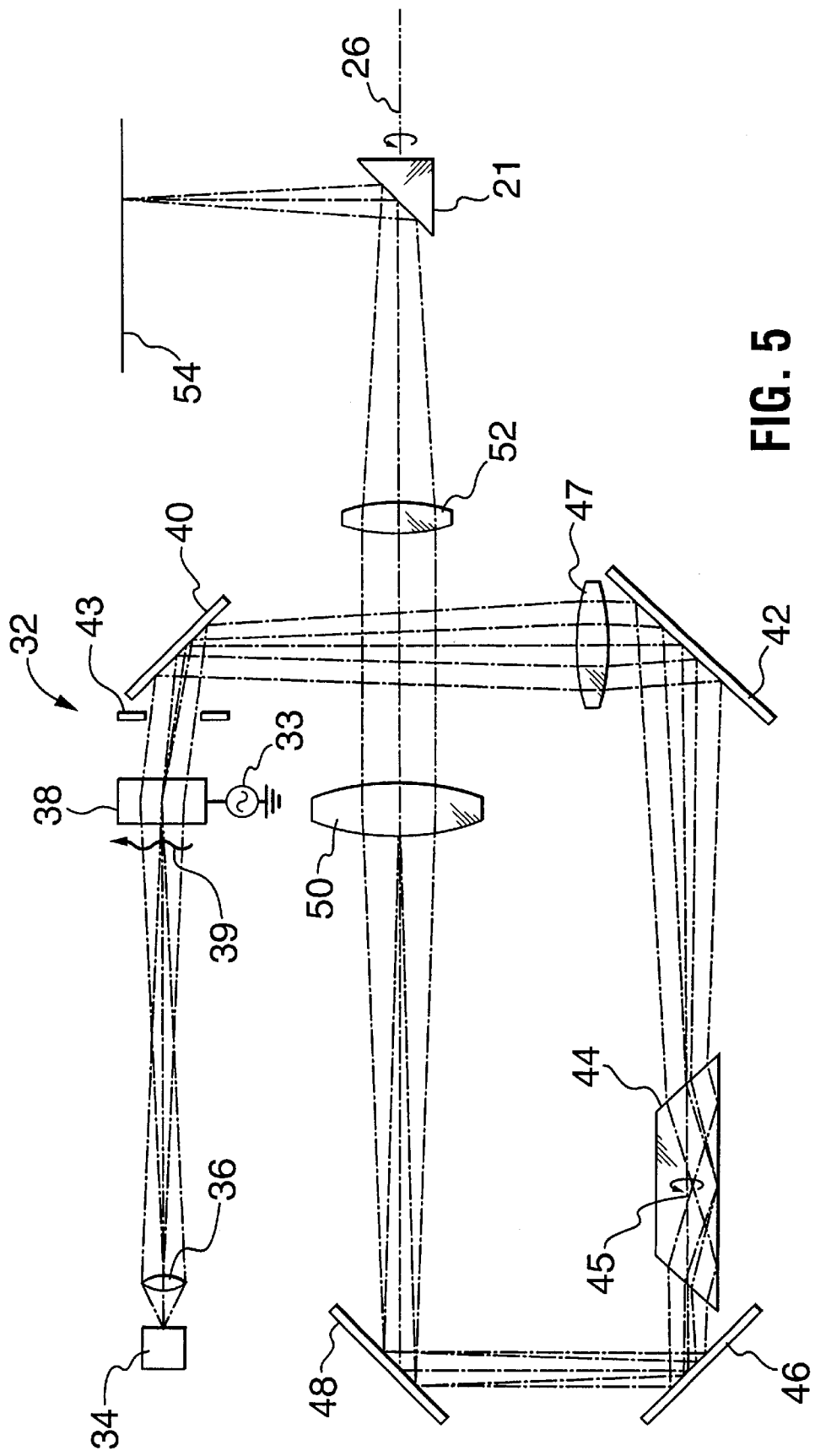
FIG. 5 is a plan view of the optical source assembly in accordance with the present invention showing the diode laser source, the acousto-optic modulator and the rotating dove prism.
Figure 7:
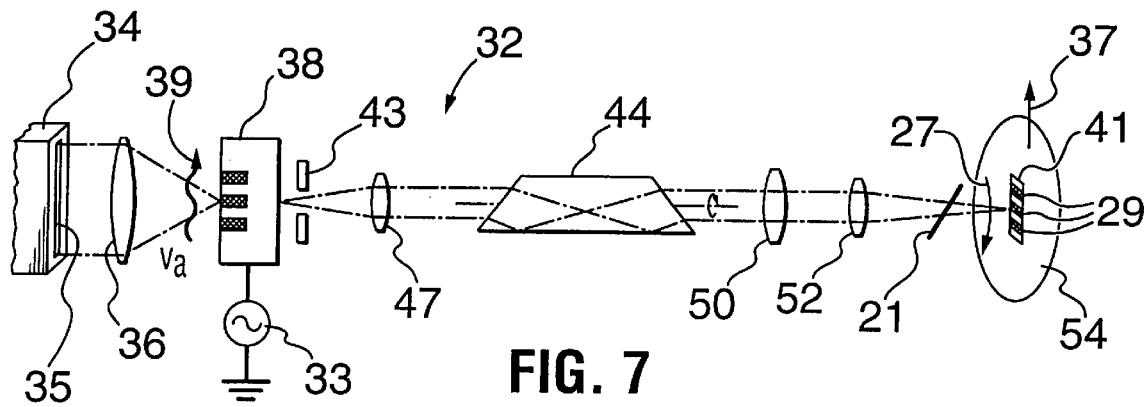
FIG. 7 is a schematic diagram showing the rectangular beam waist or stripe at the acousto-optic modulator and at the image plane showing the direction of image shift within the stripe.

Referring now to FIG. 5, the optical source assembly 32 has a laser diode assembly 34 which emits laser light through an elongated rectangular aperture 35 (see FIG. 7). The emitted light passes through a source coupling optic lens 36 and is directed onto an acousto-optic modulator crystal 38 with the long axis of the beam waist in a direction parallel to the direction of travel of the acoustic wave as shown by serpentine arrow 39. The diffracted light from the modulator 38 is reflected off of folding mirror 40, impinges on relay optic lens 47 and reflects off of folding mirror 42 after which it enters rotating dove prism 44. Dove prism 44 rotates about axis 45. After being reflected by folding mirrors 46 and 48 the light is collimated by collimating lens 50.

Figure 6:
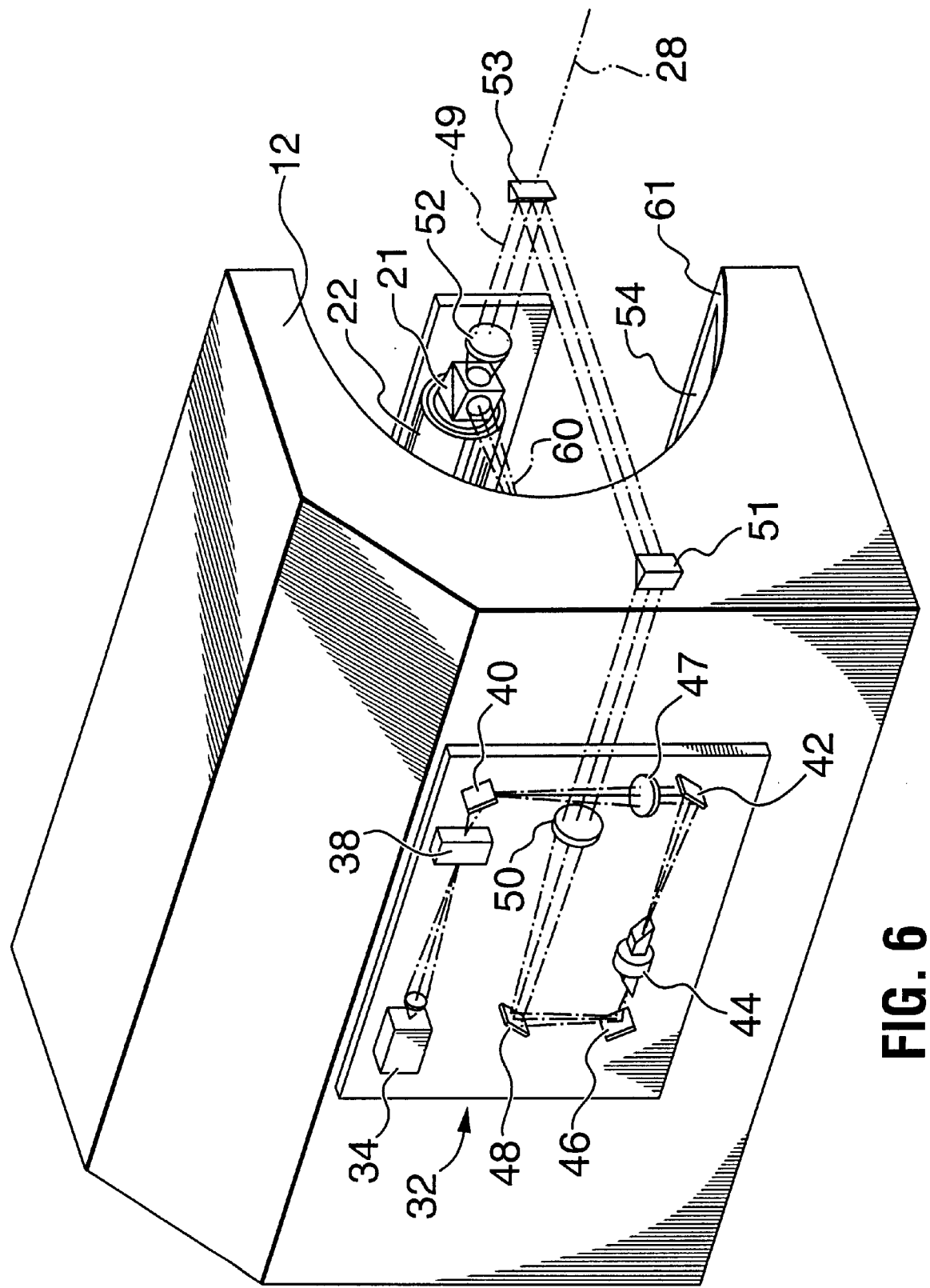
FIG. 6 is a perspective rear view of the opto-mechanical recording system showing the optical source assembly, the scan mirror assembly and the inner cylinder.

Referring to FIG. 6, the collimated beam from the optical source assembly 32 is directed along the axis of the cylinder 12 by reflection off of folding mirrors 51 and 53. After reflection off of mirror 53 the light passes through objective lens 52 onto rotating scan prism 21. Scan prism 21 is fixed at 45 degrees relative to its axis of rotation 28 and to the direction of the light beam 49 incident thereon. Scan prism 21 reflects the light radially, and normal to the interior surface 61 of cylinder 12. Objective lens 52 is positioned in front of the spindle 22 so that the focal position of the light beam 60 coincides with the surface of the recording medium 54 (see also FIG. 5) which is mounted against the interior surface 61 of cylinder 12.

As the scan prism 21 rotates, the resulting scanned focused light beam 60 scribes a circular arc of constant velocity on the recording medium 54 when mounted against the interior surface 61 of the cylinder 12. The carriage assembly 24 (see FIG. 4) is then translated along the cylinder axis 28 by means of a motorized mechanical actuator (not shown), at a rate equal to a single raster pitch spacing per rotation of prism 21, to affect complete exposure coverage of the recording medium 54.

After passing through objective lens 52, the light impinges on rotating scan prism 21 which scans the light 60 in raster bands perpendicular to the axis of rotation of scan prism 21. Rotating dove prism 44 rotates at one-half the rate of rotation of scan prism 21 and compensates for rotation of the image by the scanning process. The phase of rotation of the dove prism 44 is maintained relative to the phase of rotation of the scan prism 21 so that the long axis of the beam stripe 41 (see FIG. 7) at the inner cylindrical surface 61 of the recording medium 54 is parallel to the direction of scanning along the surface of that medium.

Referring now to FIG. 7, the operation of the optical source assembly 32 is shown schematically. The acoustic wave in the acousto-optic modulator 38 is shown having a velocity $v_a$ in the direction shown by serpentine arrow 39. The acoustic wave diffracts a fraction of the incident light by an amount which depends upon its amplitude. The amplitude modulation of the wave as produced by an RF driving signal from RF generator 33 spatially modulates the light from source 34. The first order diffracted beam passes through a spatial filter 43 which filters out the higher diffraction orders to allow only the first diffraction order to fill the system aperture. The result is optical modulation controlled by the amplitude of the RF drive level. At any point in time there are a number of acoustic pixel elements 29 within the length of the beam stripe 41 which is revealed once the diffracted beam is separated. With the diffracted beam having passed through the dove prism 44 and focused by collimating lens 50 and objective lens 52 onto rotating prism 31, and scanned along a recording surface 54, the pixels 29 are shifted with time within the beam stripe in the direction 37. By scanning in the opposite direction 21 so that the speed of scanning at the recording plane 54 is equal but opposite to that of shifting, the pixels appear motionless on the recording surface 54. This is in contrast to a conventional internal drum scanning system where a single spot is modulated in intensity as it is scanned. The resultant exposure time of such a system, at any point along the scan line, will be extended by the number of image pixels that can be resolved over the length of the laser stripe 41.

The laser diode assembly 34 radiates from a slit-shaped aperture, shown to be oriented parallel to the mounting plane. The output power level is held constant throughout the imaging process, to provide stable illumination of the optical system. The source coupling optics 36 collect the laser light and form an image of the laser aperture at the plane of the modulator 38, typically with a large magnification ratio. The coupling optics 36 may also provide other beam shaping functions such as compensation for source astigmatism.

The acousto-optic modulator 38 consists of an optically active crystal, such as lead molybdate, with a piezo-electric transducer bonded to one face. When the transducer is excited by an RF electrical signal from RF driver 33, it will launch an ultra-sonic acoustic wave through the bulk of the crystal. The acoustic waves modulate the optical density as they propagate through the crystal, and the resulting phase grating will diffract incident light. Coherent, monochromatic light beams are split up into discrete diffraction orders, which can be spatially filtered to allow only one particular diffraction order to fill the system aperture, while all others are blocked. The result is optical modulation controlled by the amplitude of the RF drive level.

The length of the projected stripe of laser light, at the modulator crystal 38, is many times broader than a single acoustic pixel spacing, working at the intended data pixel bandwidth. The spatial period of a single acoustic pixel is determined by the acoustic velocity and data clock period, as follows:

$$delta_a = mu_a * Tau$$

where: $delta_a$ is the acoustic spatial period $mu_a$ is the acoustic velocity of the crystal material Tau is the data clock period This means that at any point in time during the imaging process, the length of the light stripe 41 will illuminate a number of acoustic pixel elements. The acoustic pattern is an analog representation of the amplitude modulation of the RF drive form. The diffracted light is therefore modulated spatially, as well as temporally, and forms a real image which is then projected on to the recording plane 54.

The relay optics 47 are used to form a subsequent beam waist at the rotating dove prism 44, which causes the image of the spatially modulated laser stripe to rotate, at twice the rate of the prism rotation. The dove prism 44 is rotated at half the rate of the final scan deflector 31, so that the orientation between the long axis of the laser stripe 41 and surface of the scan deflector 31 is maintained constant. This results in a projected image of the laser stripe 41, at the recording plane 54, that does not rotate along the scan line. The phase angle between the long axis of the laser stripe and the reflective surface of the scan prism 21 remains constant, and the relative position determines the orientation of the projected stripe 41 relative to the scan direction.

The phase angles of both the scan prism 21 and rotating dove prism 44 are determined electronically by means of optical encoders (not shown), attached to the respective rotors for the scan prism 21 and the rotating prism 44. The encoders each consist of a glass disc with an opaque, fine pitched radial grating, patterned on its surface. A thin beam of light is projected through the grating, which chops the light beam, and generates a tachometer clock signal at the opposing optical detector. A secondary marking and optical transceiver pair (not shown) generate a phase index clock, once per rotation. The tachometer and phase index signals are processed using phase locking circuitry to generate drive waveforms which synchronize the rotations of the two rotors. The phase difference can be controlled electronically, and is aligned so that the projected laser stripe 41 at the recording plane 54 is aligned parallel to the scan direction.

The Scophony velocity matching condition constrains the scan rate, depending only on the acoustic velocity of the modulator crystal 38 and the magnification of the optical system. The scan rate of the present invention is controlled by electronically tuning the rotation rate of the scan prism 21. A tachometer signal generated by a spindle encoder in tachometer 25 shown in FIG. 4 is used to phase lock the drive waveform to a precision tunable crystal oscillator (not shown). That tachometer signal is also used to synchronize the modulation of the pixel data, necessary to accurately place the pixels 29 along the scan line.

Finally, the collimation lens 50 is used to contain the beam divergence, and deliver a parallel beam of light to the final focusing objective 52. A collimated beam is necessary so that the final focus position remains at the recording plane 54 throughout the travel of the carriage assembly 24. The light beam 60 is directed on to the cylinder axis and scan mirror 21 by means of folding mirrors 51 and 53 so that the optical source assembly 32 can be mounted on the rear of the cylinder body 12.

Figure 8:
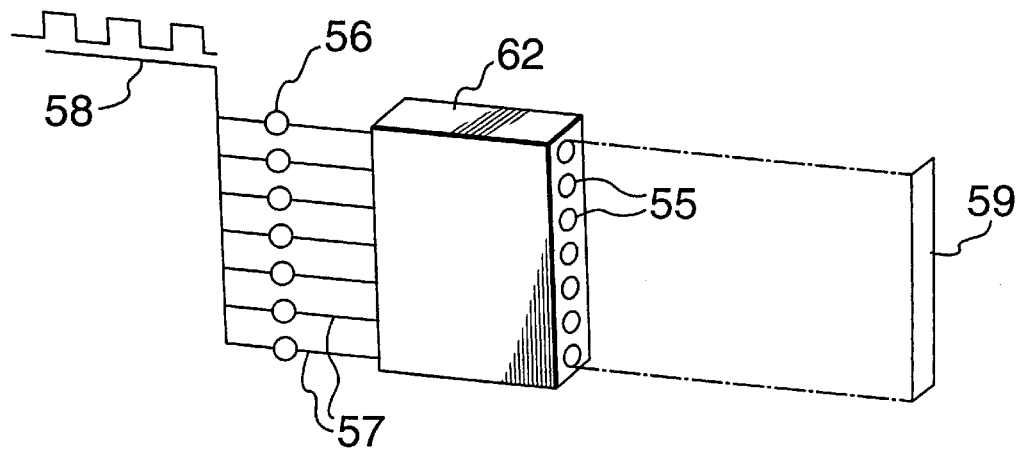
FIG. 8 is a perspective view of an alternative light source consisting of individually addressable multiple laser diodes stacked in a linear array.

Referring to FIG. 8 an alternative light source 62 consists of a linear stacked array of electrically isolated laser diodes 55 each of which are individually addressable. Light output from diodes 55 passes through an elongated generally rectangular aperture 59. Each diode is coupled by an address line 57 through a delay 56 to an input line 58 so that the light output can be modulated by varying the turn-on time of each of the lasers 55. Thus, by using the light source 62 of FIG. 8, one can eliminate the need for a separate modulator and instead modulate the light by simply varying the delay to each of the individual laser diodes in the array.

Obviously, a linear stacked array of laser diodes could be used in place of the laser diode assembly 34.

Obviously, other types of optical devices could be used to rotate the image other than a dove prism. For example, a Paschen prism or K prism could accomplish the same effect.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. An optical recording and data processing system for exposing an image onto a flexible, light sensitive image recording medium, comprising:

(a) a medium holder having an inner cylindrical wall portion against which is held the image recording medium;

(b) a light source which emits a beam of light from an approximately rectangular emitting aperture, said rectangular emitting aperture having a short aperture axis and a long aperture axis;

(c) a spatial modulator positioned to intercept the beam of light from said light source and operative to produce a time varying spatially modulated pattern which shifts across the length of said long aperture axis at a substantially constant rate;

(d) a rotating beam deflector positioned in the path of said beam of light and rotated so as to produce a rotating spatially modulated pattern;

(e) a scanning deflector rotating about an axis aligned with an axis of an interior cylindrical surface at a rate of rotation equal to a rate of rotation of said spatially modulated pattern and aligned to an axis of said beam of light so as to deflect said beam of light substantially orthogonal to said axis to provide a scanning motion around an inner circumference of said image recording medium;

(f) a scanning deflector advancement assembly coupled to said scanning deflector and operative to advance said scanning deflector, after scanning a row, to an adjacent row to enable scanning of the adjacent row; and (g) optical focusing components, positioned in a path of said beam of light between said spatial modulator and said interior cylindrical surface, operative to focus said beam of light and project an image of said spatially modulated pattern onto said image recording medium;

wherein orientation of the projected image of said spatially modulated pattern on said image recording medium is maintained parallel to a direction of said scanning motion such that a direction of movement of the projected image due to the shifting is parallel to the scanning motion, but opposite in direction; and wherein said optical focusing components provide an optical magnification factor equal to a ratio of the scan velocity at image recording medium divided by the shifting velocity of said spatially modulated pattern whereby a scanning velocity at said image recording medium produced by rotation of said scanning deflector is equal to but opposite in direction to the shifting velocity of said spatially modulated pattern so as to maintain said pattern stationary on said image recording medium during exposure.

2. A system according to claim 1, wherein said light source is a linear array of individual lasers individually addressable for spatially modulating said light beam and including a plurality of delays coupled to respective ones of said lasers wherein each delay is different from the other of said delays and including a signal generator so as to cause the light from said lasers to be spatially modulated and to shift the modulation pattern.

3. A system according to claim 1, wherein said spatial modulator is an optical modulator which spatially modulates light from said light source and shifts the modulation pattern.

4. A system according to claim 1, wherein said optical modulator is an acousto-optic modulator and wherein said optical focusing components form a rectangular beam waist having a long axis corresponding to the long axis of the emitting aperture.

5. A system according to claim 1, wherein said scanning deflector is a mirror surface oriented at 45 degrees to a direction of incidence of light traveling along said axis.

6. A system according to claim 1, wherein said light source is a laser diode.

7. A system according to claim 1, wherein said rotating beam deflector which rotates said spatially modulated pattern is a dove prism rotating at half the angular velocity of said scanning deflector.

8. A system according to claim 1, wherein said scanning deflector advancement assembly advances said scanning deflector along said axis at a rate equal to one image track spacing per integer number of scan rotations.

9. An internal drum raster optical recorder having a flexible image recording medium mounted against an inner cylindrical mounting surface, comprising:

(a) a laser diode light source optically coupled to produce a beam of light having an elongated rectangular beam waist, said beam waist having a long axis along a long dimension of said beam waist and a short axis along a short dimension of said beam waist;

(b) an acousto-optic modulator crystal positioned so that an acoustic propagation direction is aligned to intercept said beam of light along the long axis thereof and operative to modulate said beam of light in response to a modulating signal and to produce an image of said modulating signal which shifts in the direction of acoustic travel;

(c) a rotating dove prism positioned to intercept and rotate said image of said modulating signal;

(d) means for directing said beam of light along an axis of said inner cylindrical mounting surface;

(e) an optical mirror surface oriented at 45 degrees to the axis of said inner cylindrical mounting surface, affixed to a spindle rotating on said axis, so as to deflect said beam of light radially to provide a scanning motion around an inner circumference of said recording medium;

(f) an advancement assembly coupled to said spindle and operative to advance said rotating spindle along said axis at a rate equal to one image track spacing per integer number of scan rotations; and (g) an optical system positioned in a path of said beam of light between said acousto-optic modulator and said image recording medium, operative to project an image of said modulating signal onto said image recording medium;

wherein orientation of the modulated image pattern on the recording medium is maintained parallel to a direction of scanning of said modulated image pattern such that a direction of movement of the image due to shifting is parallel to scanning motion, but opposite in direction thereto; and wherein said optical system provides an optical magnification equal to a ratio between an acoustic velocity of the acousto-optic modulator crystal and a scanning velocity at said recording medium whereby the scanning velocity along said image recording medium produced by rotation of said optical mirror is equal in magnitude but opposite in direction to a velocity of shifting movement of pixels within said image so as to maintain said modulated image pattern stationary during exposure of said image recording medium.

* * * * *